United States Patent [19]

Aboaf et al.

[11] Patent Number: 5,142,768
[45] Date of Patent: Sep. 1, 1992

[54] METHOD FOR MAKING MAGNETIC HEAD WITH ENHANCED POLETIP

[75] Inventors: Joseph A. Aboaf; Edward V. Denison; Vincent N. Kahwaty; Gerald Steving, all of Tucson, Ariz.

[73] Assignee: International Business Machines Corporation, Armonk, N.Y.

[21] Appl. No.: 694,611

[22] Filed: May 2, 1991

[51] Int. Cl.$^5$ ............................................. G11B 5/42
[52] U.S. Cl. ............................... 29/603; 360/119; 360/122; 427/131
[58] Field of Search ............... 29/603; 427/128, 131, 427/132; 360/119, 120, 121, 122, 127

[56] References Cited

U.S. PATENT DOCUMENTS

5,016,341  5/1991  Ogawa et al. .................. 29/603

Primary Examiner—Carl E. Hall
Attorney, Agent, or Firm—J. A. Pershon; M. W. Schecter

[57] ABSTRACT

An interleaved bi-directional magentic tape head for contact recording can have a poletip enhanced by providing a thin film of a soft magnetic material deposited onto a magnetic ferrite substrate. The second pole piece is a thin film of the soft magnetic material. A closure block of a non-magnetic ceramic encloses the layers together with leveling insulation layers and a deposited activating conductor turns. The stripe poletip deposited onto the magnetic ferrite extends for a distance just short of the first conductor turn and provides a balancing of the saturation moment of the pole pieces and provides for better recording capability, especially when operating in a trailing magnetic ferrite mode.

5 Claims, 5 Drawing Sheets

METHOD FOR MAKING MAGNETIC HEAD WITH ENHANCED POLETIP

TECHNICAL FIELD

This invention relates generally to a thin film magnetic head particularly for magnetic recording, and more specifically to a magnetic head with an enhanced poletip for a magnetic ferrite substrate and a method for making the magnetic head.

BACKGROUND OF THE INVENTION

In high speed data processing systems, magnetic recording has been employed for large memory capacity requirements. Data is read from and written onto the magnetic recordings using magnetic transducers commonly called magnetic heads which are positioned adjacent to the magnetic recording medium. For a contact recording, wherein the magnetic recording medium comes in contact with the magnetic head, the pole pieces are generally made of a magnetic ferrite material because of its wearing characteristics. The magnetic ferrite pole pieces, while having good wearing characteristics for the contact recording particularly with magnetic tape, however, lack the efficiency to record on high coercivity recording medium in the higher data density requirements for present day data recording. Magnetic heads having thin film pole pieces were developed to increase the saturation moment of the pole pieces and to increase the operating efficiency of the transducers, especially in the write or data recording procedure.

Thin film pole pieces, however, while providing the required efficiency to write the higher data density requirements, could not withstand the abrasion of the magnetic recording medium, especially in the contact recording situation. A first order requirement for high density recording is the minimizing of spacing between the surface of the media and the functional recording gap between the pole pieces. With the soft magnetic material thin film poletips of nickel-iron, for instance, the functional recording gap and the poletips are susceptible to wear by the media. Increasing the spacing between the recording gap and the media deteriorates the recording performance.

The write saturation performance characteristics of an interleaved, bi-directional, magnetic head operating in ferrite-trailing mode are not as good as those during operation in poletip-trailing mode. The mode of operation depends on the direction of tape travel: during ferrite-trailing mode, the tape travels across the gap towards the deposited poletip; in poletip-trailing mode, the tape travels towards the ferrite poletip. Regardless of write mode, a head experiences amplitude loss at high write currents. However, because of the lower saturation moment of the ferrite poletip compared to that of the deposited poletip, the amplitude loss is significantly more severe in ferrite-trailing mode. The problem thus presented is how to better balance the saturation moments of the poletips.

Figure 1A:
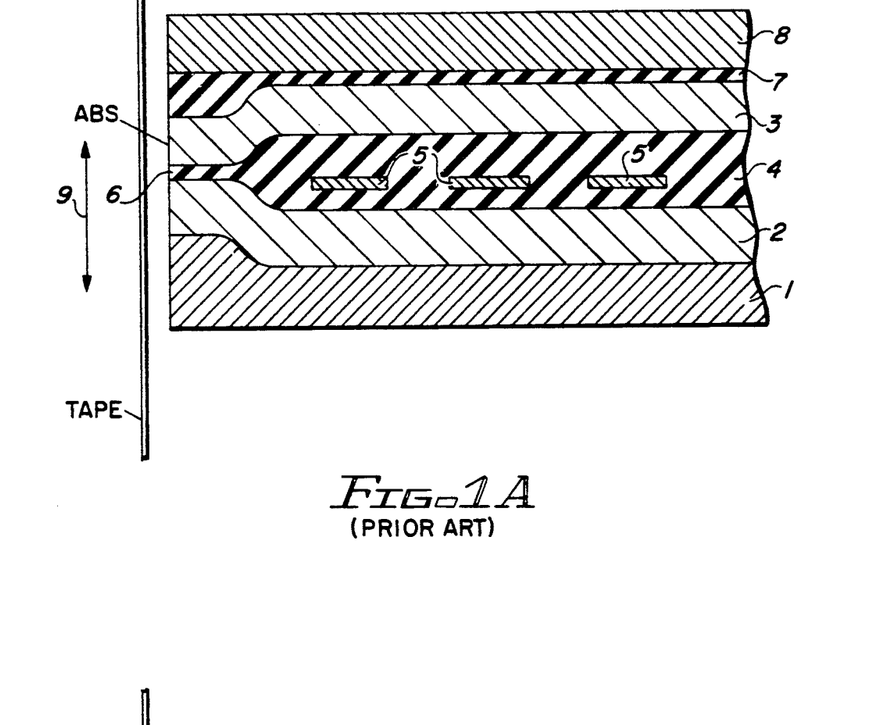
FIGS 1A and B are sectional views of prior art thin film recording magnetic heads.

FIG 1A shows a typical conventional thin film magnetic head for use in contact recording on flexible magnetic media, such as magnetic tape. The prior art thin film magnetic head of FIG 1A includes a non-magnetic substrate 1, generally made of a non-magnetic ceramic. A first thin film pole piece 2, generally made of a Permalloy; i.e., a nickel-iron material, is deposited onto the substrate 1. A second thin film pole piece 3 of the same nickel-iron material is deposited onto an insulating layer 4 which encompasses the coil conductors 5 and forms a magnetic gap 6. A support and leveling material 7, generally non-magnetic, is deposited onto the second pole piece 3. The support material 7 is then covered by a non-magnetic closure piece 8. A magnetic tape media moves in a direction as shown by arrow 9 operating in a motion transverse to the pole pieces 2 and 3 over an air-bearing surface (ABS) where the contact recording takes place.

Figure 1B:
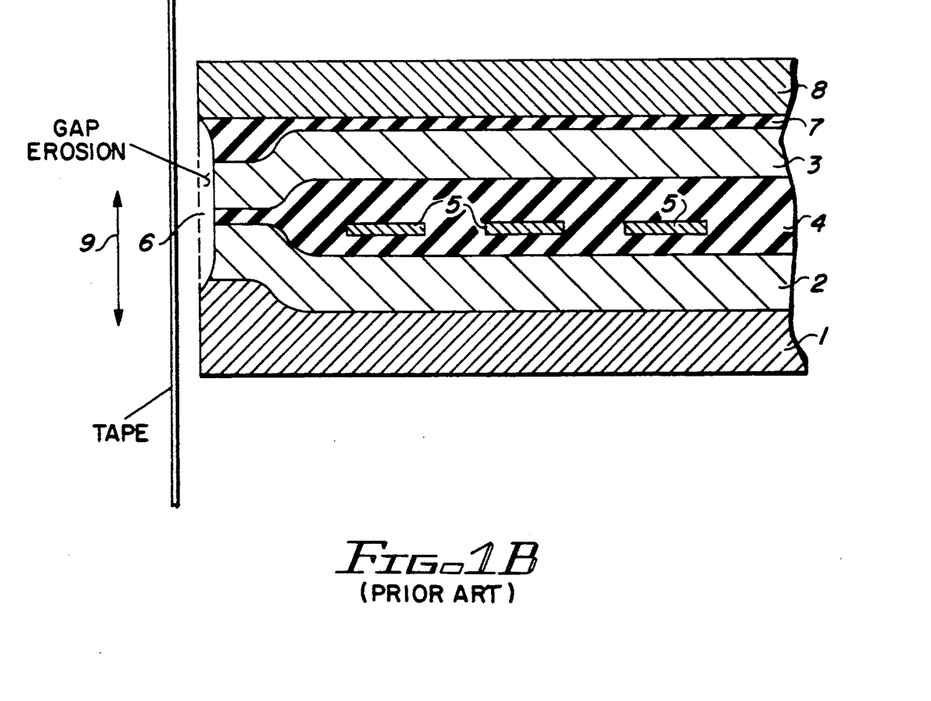

FIG 1B depicts a likely gap erosion profile on the ABS of a standard thin film recording head after wear as a result of the magnetic tape coming in contact at the ABS. Referring to FIG 1B, the thin film pole pieces 2 and 3 are soft compared to the ceramic substrate 1 and the ceramic closure 8. The greatest erosion caused by the contact recording is in the functional gap region 6 and is identified as gap erosion. The erosion is generally also great in the support material 7, but generally this area is far enough away from the functional gap region 6 as not to be a primary concern. The effective gap spacing from the ABS can easily be several microinches. At a recording density of 2300 flux changes per micrometer the signal loss for each microinch of spacing is 1.58 decibels. It is, therefore, essential to minimize effective gap erosion to achieve high density recording objectives.

Figure 1C:
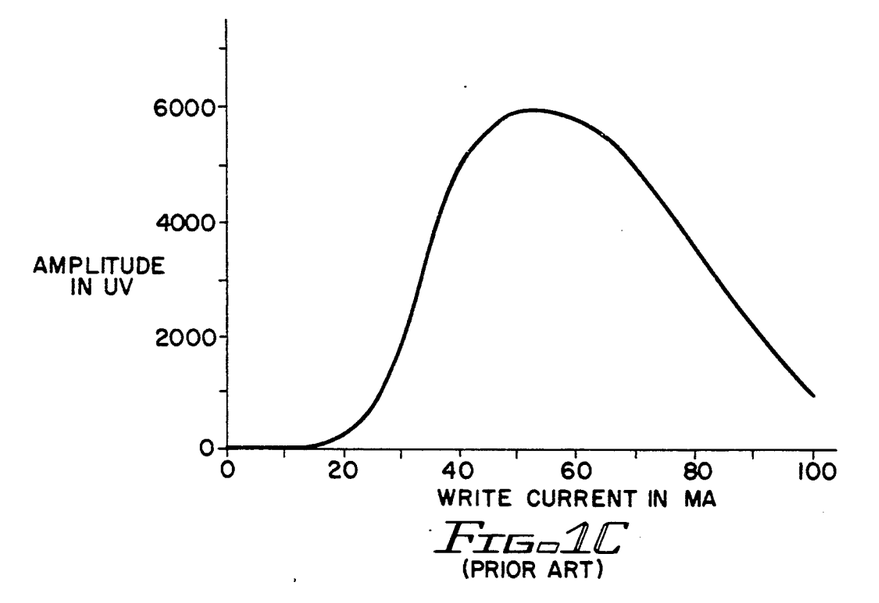
FIGS 1C and D are curves showing a recording characteristic of prior art recording magnetic head.
Figure 1D:
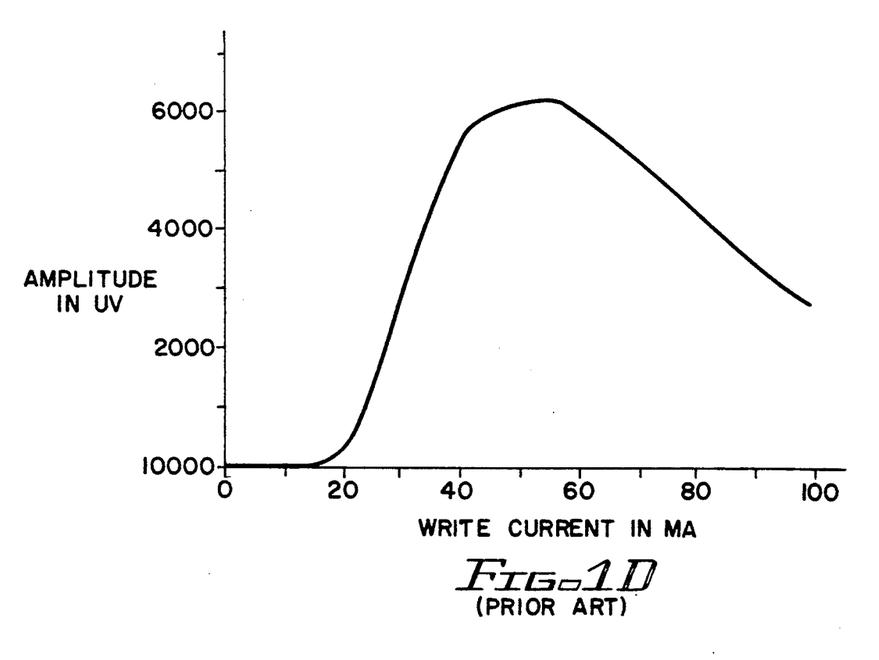

Based on write saturation characteristics, it is best to use a thin film pole piece as the trailing pole piece for the write mode of magnetic heads. The write saturation characteristics in the use of a trailing pole piece of a block of magnetic ferrite material are not as good at short wavelengths, see FIG 1C. In FIG 1D, a curve shows the output amplitude of magnetic transitions when the write current is increased in a thin film trailing pole piece, such as the head of FIG 1A. In FIG 1D, the output amplitude is higher at its peak with approximately 60 milliamperes of write current and has a good output when 100 milliamperes of write current is applied to the head. The ferrite block amplitude output of FIG 1C is lower at its peak and is essentially zero at a high write current of 100 milliamperes. The degradation of the amplitude output is attributed to the lower saturation moment of the ferrite material as compared to the nickel-iron material normally used for thin film pole pieces. What is needed is a magnetic head that has the wear characteristics of a ferrite block trailing pole piece and the amplitude output of a thin film trailing pole piece.

Prior attempts to lessen the gap erosion include the use of a magnetic ferrite substrate as the first pole piece and a thin film magnetic layer as the second pole piece. This would have the affect of lowering the gap erosion, but balancing the saturation moment of the completely different pole piece materials caused insurmountable problems, especially with the flexible magnetic media that must be operational in both directions and, therefore, must operate in a trailing magnetic ferrite mode.

The present invention, therefore, provides for an improved magnetic head for contact recording that lowers the erosion as a result of the contact at the functional magnetic gap region, while providing pole pieces that have a balanced saturation moment.

SUMMARY OF THE INVENTION

The present invention provides a magnetic recording head, preferably an interleaved transducing head, that has a magnetic transducing gap region that is protected from erosion while having an enhanced thin film poletip for better recording operation. The magnetic recording includes two thin film deposited poletips. The additional thin film poletip is deposited directly on a magnetic ferrite substrate that also forms a part of the magnetic circuit. A very thin layer, for example, alumina, can be deposited first on the magnetic ferrite substrate as an etch stop layer, for instance. A soft magnetic material is deposited on the alumina layer and patterned using a photoresist mask and etch cycle to create the additional thin film poletip. The additional poletip extends over the magnetic ferrite pole piece section or can extend part way into the head structure almost reaching the first turn of the coil. The size limitation is mainly dependent on good manufacturing processes to assure an adequate adhesion to the magnetic ferrite substrate and to provide the necessary saturation moment. A magnetic gap layer, coil turns, insulation layers, a second thin film pole piece, support insulation layers and a non-magnetic ceramic layer complete the head structure. By using the same soft magnetic material for both poletips, the saturation moments thereof are balanced, thereby eliminating the excess amplitude loss associated with operation in the magnetic ferrite-trailing mode. In effect, the magnetic head always operates in poletip-trailing mode, regardless of the media direction.

A magnetic recording head, according to the present invention, includes at least one row of transducing elements, separate read and write elements, according to the preferred embodiment, with the read elements produced from stripes of a magnetoresistive (MR) material interleaved with alternating write transducers. A first pole piece of the write transducer is formed from a thin film of magnetic material deposited on a substrate of magnetic ferrite adjacent to the air-bearing surface (ABS) tape interface for a minimum distance for good adhesion to the magnetic ferrite and a required saturation moment which, in the preferred embodiment, is generally just short of a first conductor turn or wider. The second pole piece is a thin film of magnetic material deposited onto the insulation layer forming the magnetic gap and encompassing the conductor turns. The closure block bonded to enclose the pole pieces is made of a non-magnetic ceramic material.

In a method of making a magnetic head, the steps include obtaining a substrate of a magnetic ferrite material and depositing at least a stripe of a magnetic material in a thin film adjacent to an edge that forms the ABS. A very thin etch stop and smoothing layer of alumina, for instance, can be deposited between the substrate and the soft magnetic material. A gap producing insulating material is then deposited over the stripe to form a magnetic gap layer. An electrically conductive material is deposited onto the gap producing insulating material to form conductor turns for the magnetic head with the first turn starting immediately adjacent to the stripe of magnetic material. An insulating material is then deposited over the conductive material forming the conductor turns. A thin film of magnetic material is deposited over the insulating material and the gap producing insulating material to provide a second pole piece for the magnetic head. A support insulating layer material is then deposited over the magnetic layer adjacent to the poletip end of the air-bearing surface. A leveling layer of insulating material is deposited over the support insulating layer and the remaining portion of the second pole piece material. A closure block of a non-magnetic ceramic material is bonded then to the leveling layer.

An object of the present invention, therefore, is to provide an enhanced magnetic head and a method for making an enhanced magnetic head.

Another object of the present invention is to provide a contact recording magnetic head which has the efficiency of thin film pole pieces together with a simple construction method.

A further object of the present invention is to provide 19 an interleaved magnetic head that includes an additional thin film poletip for the write transducer that has the saturation moment of the pole pieces balanced while retaining the close protection of the magnetic gap region by the magnetic ferrite section of the first pole piece.

These and other objects of the present invention will become apparent to those skilled in the art as the description proceeds.

BRIEF DESCRIPTION OF THE DRAWINGS

The various novel features of this invention, along with the foregoing and other objects, as well as the invention itself, both as to its organization and method of operation, may be more fully understood from the following description of illustrated embodiments when read in conjunction with the accompanying drawing, wherein.

DETAILED DESCRIPTION OF THE EMBODIMENTS

The present invention is preferable for use in an interleaved magnetic head. The interleaved magnetic head is used to read and write magnetic transitions from a multitrack media. This, in turn, finds its major usage in tape drive systems. A typical tape drive system, well known today, is the IBM 3490 tape drive. In a tape drive system, the transducer generally remains fixed and the tape is moved across the transducer in both directions to read and write from various transducers in the magnetic head to record data information onto at least one of a plurality of tracks on the media. The interleaved head is of particular importance since the number of tracks can be increased while still providing the bi-directional operation of the media and also permitting an immediate read back check of the data just written onto the media. Reference is made to the U.S. Pat. No. 4,125,881 to Eige, et al., and assigned to the assignee of the present invention for a more Complete description of a reel-to-reel tape drive and its control which is useful together with the interleaved magnetic head of the present invention. An example of a tape drive for threading the tape media through a complex tape path is disclosed in U.S. Pat. No. 4,335,858 to Cranna, also assigned to the assignee of the present invention. An interleaved magnetic head is disclosed in U.S. Pat. No. 4,685,005 to Fields, and is also assigned to the assignee of the present invention. The disclosure in all of these patents is incorporated herein by reference for a more detailed description of the preferred embodiment. The magnetic head to be used in the practice of the present invention can take the form of any of a number of thin film construction types and arrangements. By the use of photolithography, it is possible to maximize use of the surface of the magnetic media, since narrow, closely placed tracks can be written.

Figures 2, 6:
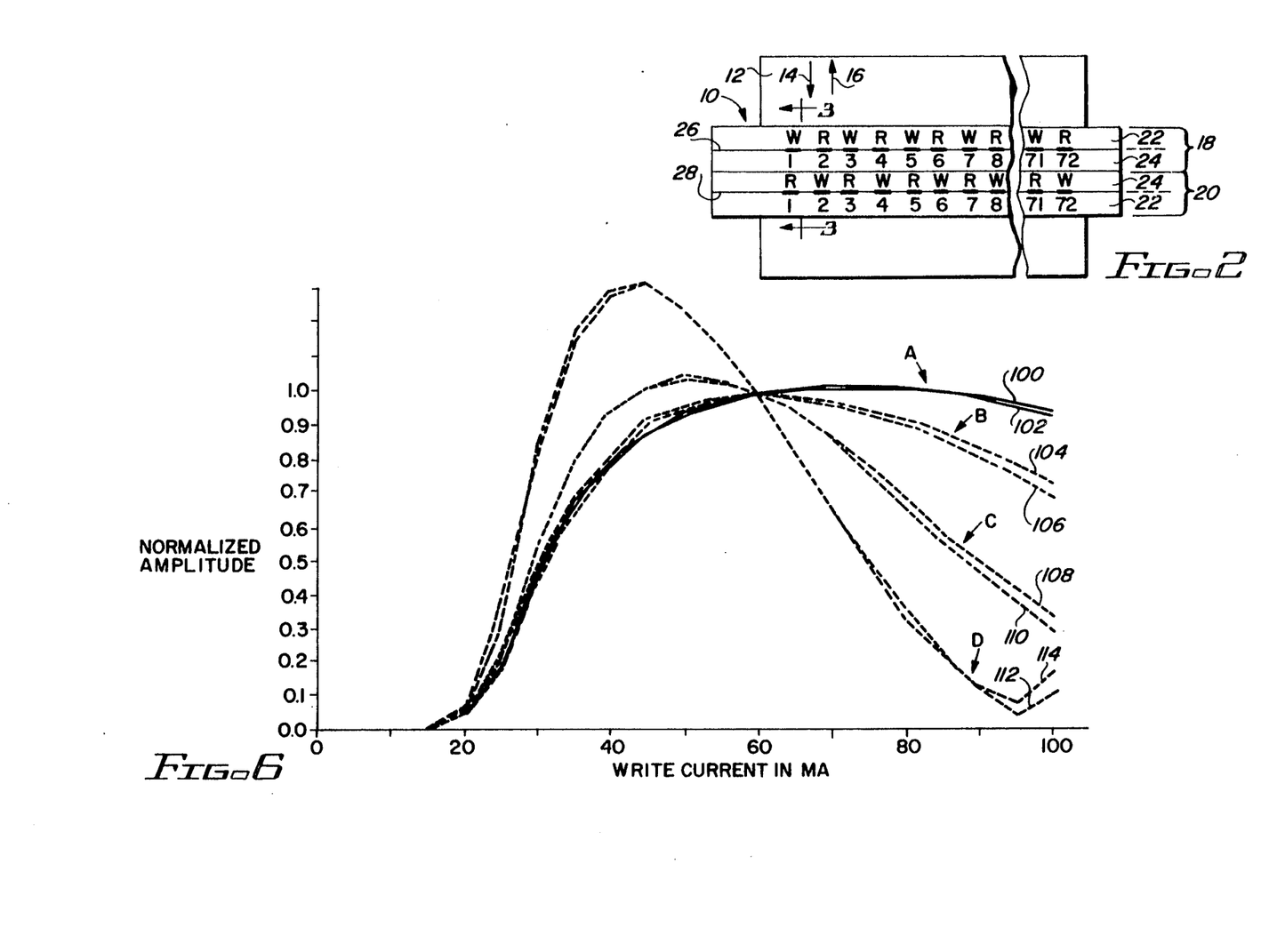
FIG. 2 is a diagrammatic perspective view of a section of an interleaved magnetic head that uses the elements of the present invention.
FIG. 6 shows write saturation characteristic curves at different wavelengths comparing the configuration of the present invention of FIG. 3 to the prior art of FIG 1A.

In the preferred embodiment of a thin film magnetic recording head, as is shown in FIG. 2, an interleaved magnetic head 10 is preferable. The read elements are marked R for the magnetic head 10, while the write transducers are marked W. The read and write gaps are used in immediately alternating, odd/even fashion. The term alternating is intended to include other formats. For example, it is the preferred embodiment of the present invention to provide a format of 72 tracks across the width of the media, hereinafter called tape media. One format provides that the odd numbered tracks, tracks 1, 3, 5, and so-forth, are operated during forward tape movement, while the even numbered tracks 2, 4, 6, and so-forth, are operative during the opposite direction of the movement of the tape media.

In general, referring to FIG. 2, the length of the magnetic tape 12 moves in both a forward and reverse direction as indicated by arrows 14 and 16. The arrow 14 designates the forward movement direction of the tape 12 and the arrow 16 designates the reverse direction. The magnetic tape 12 operates in transducing contact relationship with the magnetic head 10 in the standard well known format. The magnetic head 10 includes two modules 18 and 20 of generally identical construction. These two modules ar bonded together to form a single physical unit. In this manner, the transducing gaps of one module are not only closely spaced to the transducing gaps of the other modules, but also the module gaps are accurately aligned in the direction of tape movement. There are 36 read transducers and 36 write transducers in each of the modules 18 and 20. The magnetic tape 12, therefore, has 72 tracks across its one-half inch width. Each of the modules 18 and 20 include a magnetic ferrite substrate 22 and a non-magnetic ceramic closure piece 24. Each module includes one gap line 26 for module 18 and one gap line 28 for module 20 to form the single physical unit of the magnetic head 10. Reference is made to the aforementioned U.S. Pat. No. 4,685,005 for a more detailed description of the preferred embodiment as adapted to an interleaved magnetic head. Reference is also made to an IBM Technical Disclosure Bulletin to Franklin et al, Vol. 18, No. 6, November 1975, at page 1981, for a method of isolating blocks of magnetic ferrite to form multitrack write elements.

Figure 3:
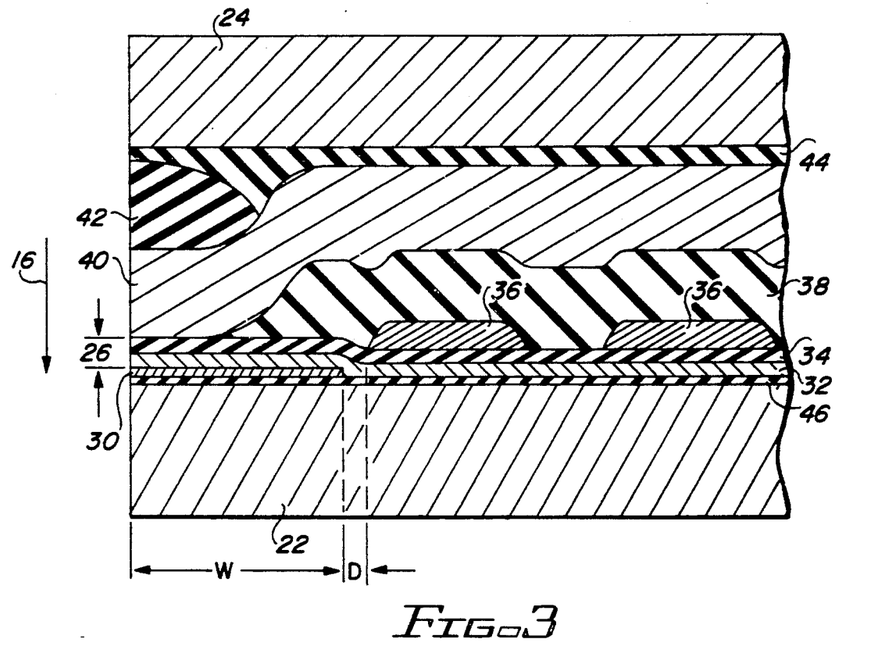
FIG. 3 is a sectional view of a write element of the interleaved magnetic head shown in FIG. 2 and taken along lines 3—3.

FIG. 3 is a cross-sectional view take along lines 3—3 of FIG. 2 and discloses the enhanced pole pieces according to the present invention. The write transducer of the present invention is shown encompassed between the magnetic ferrite substrate 22 and the non-magnetic ceramic closure block 24. The same reference numerals are used in the drawings to indicate like structural features and operation in the various figures. The magnetic ferrite substrate 22 can be made from a magnetic nickel-zinc ferrite or a magnetic manganese-zinc ferrite or any of the magnetic ferrite materials known for use in magnetic heads. The non-magnetic closure 24 can be formed by any of the non-magnetic ceramics, such as non-magnetic ferrites and, again, the usage of non-magnetic ceramic materials in magnetic heads is well known. The write transducers in the interleaved head of FIG. 2 operate in the trailing magnetic ferrite mode direction and, thus, in the write operation of the transducer shown in FIG. 3, the tape media 12 operates in the direction shown in arrow 16. An etch stop layer, preferably of amorphous alumina at a 500 Angstrom thickness, is generally deposited to provide an etch stop layer for processing the deposition of subsequent layers and to provide a smoother surface for the next film. If this amorphous layer is not included, a replication of the ferrite grains may lead to crystal growth of an additional first poletip 30 and a rough film which might lead to non-uniform coverage of the subsequent thin film layers during further processing of the head. This etch stop layer 46 may be deleted if not required. A soft magnetic material, such as nickel-iron, is deposited and patterned using a photoresist mask and etch cycle to create the additional first poletip 30. The magnetic gap region 26 can include two layers of magnetic and electrical insulating layers 32 and 34, preferably of alumina. Activating conductor coil turns 36 are deposited onto the insulating gap layers 32 and 34. The conductor turns 36 can be made of an electrically conductive material, such as copper or gold. An electrically insulating material 38, such as a hardened photoresist, is deposited over the coil turns 36. A second thin film pole piece 40 of soft magnetic material, such as nickel-iron, is deposited over the gap region 26 and the insulating layer 38. A support insulating layer 42, preferably of a hardened photoresist is formed over the poletip section of the second pole piece 40. A leveling layer 44 of alumina and/or an epoxy material, for instance, is then formed over the second pole piece 40 and the support insulated layer 42. The leveling layer is then lapped flat. The support insulating layer 42 and the leveling layer 44 together provide a flat surface for the bonding of the non-magnetic ceramic closure 24 to produce the completed write transducing element. Both poletip 30 and polepiece 40 have a composition preferably of 80% nickel and 20% iron.

Figure 4:
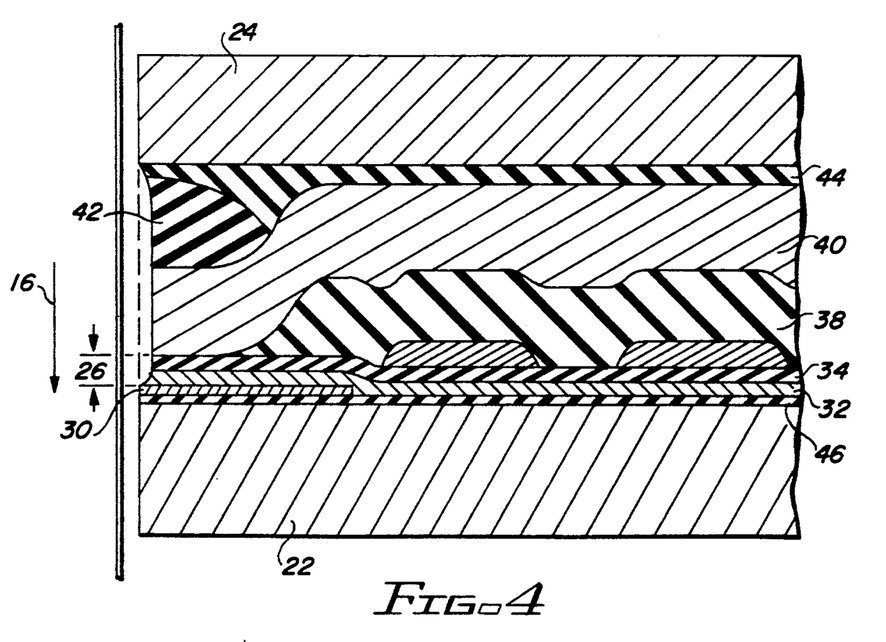
FIG. 4 is a sectional view of the write transducer of FIG. 3 showing its wear pattern after contact recording with a recording media.

In the preferred embodiment, the additional poletip 30 of the first pole piece has a width W and extends very close to the first coil turn 36. Preferably, the difference D is within 2 micrometers of the first coil turn. This geometry is used to assure good adhesion of the additional poletip 30 to the magnetic substrate 22 and to prevent electrical shorts between the poletip 30 and the coil turns 36, especially at the edge of the poletip 30. The magnetic gap region 26 is located adjacent to the very hard magnetic ferrite substrate 22, which provides a low sensitivity to erosion of the magnetic gap 26, and also provides for higher recording density. The preferred embodiment of this invention uses a magnetic substrate 22 as the first pole piece together with the poletip 30 which extends very close to the first coil turn 36. The poletip 30 need only be approximately 5000 Angstroms in thickness in order to be adequate to write metal media of 1500 Oersteds which is a very high coercivity media known today. The magnetic gap 26 is preferably formed by the combined thicknesses of the layers 32 and 34, which also insulates the write coils 36 from the magnetic substrate 22. In the preferred embodiment, the thin film layer 46 of alumina on the order of 200 to 500 Angstroms thickness is deposited over the substrate 22 before the deposition of the soft magnetic material of the poletip 30. In FIG. 3, the poletip 30 is shown in the preferred embodiment having a width W and extending a distance D from the first coil winding 36. The additional poletip 30 may cover the entire surface of the substrate 22 that provides the ferrite portion of the first pole piece up to the back gap region (not shown). The limitation of the width W of the poletip 30 is that it must be wide enough to provide the write saturation characteristics required and to assure good adhesion to the substrate 22 such that, preferably at zero throat height, approximately 12 micrometers of additional poletip 30 is still present. FIG. 4 illustrates a likely ABS erosion profile for the write element of FIG. 3.

Referring to FIG. 4, the profile of the magnetic tape path over the write element is shown in a dotted line. The functional area of the magnetic gap 26 is very close to the hard magnetic ferrite surface of the substrate 22. The additional thin poletip 30 provides the capability of very high recording density even with the substantial erosion of the magnetic gap 30 as can be expected in normal usage.

As shown in FIG. 3, the additional poletip 30 must cover a surface such that the poletip 30 will not saturate. Preferably, the width W of the stripe of the poletip 30 must be at least approximately 12 micrometers in width. Too short of a width may cause the poletip 30 to saturate with the write current and will decrease the write transducer's ability to form transitions on high coercivity magnetic tape, even with extremely thick polepiece formed with the substrate 22. The poletip 30 may extend over the entire surface of the magnetic ferrite substrate 22 that forms the pole pieces of FIG. 3 for a single track. The poletip 30 in this embodiment will then extend from the air bearing surface beneath the tape to the back gap (not shown) of the magnetic circuit.

Figure 5A:
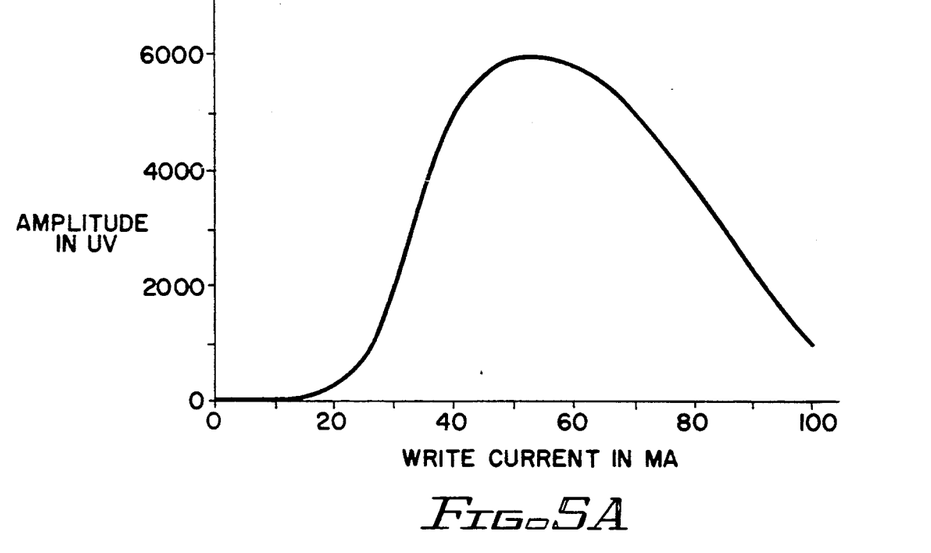
FIGS. 5A and 5B are curves showing the output read amplitude of the same head without and with the present invention head, respectively.
Figure 5B:
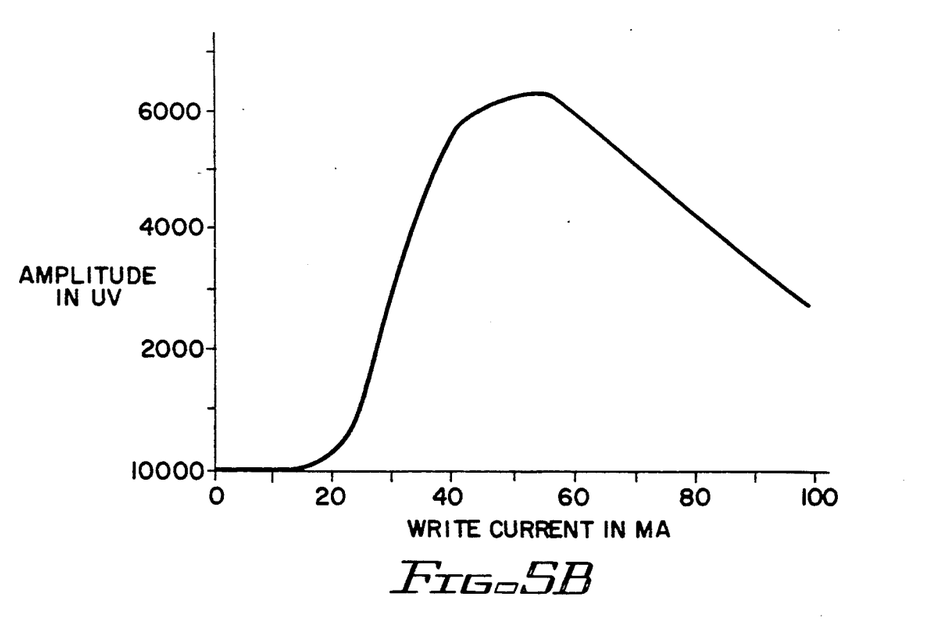

FIG. 5A shows the write saturation characteristic for the prior art magnetic ferrite-trailing mode. FIG. 5B shows the trailing mode of the present invention. The magnetic ferrite material as shown in FIG. 5A shows a severe amplitude loss at a high write current, 100 milliamperes in the curve. The microvolt amplitude output decreases to below 1000 microvolts when the write current is 100 milliamperes. The write current is applied to a write head having the same configuration as shown in FIG. 3 without the soft magnetic stripe additional poletip 30. The writing is executed on standard magnetic tape, such as the IBM 3490 tape drive magnetic tape. The data is then read by a magnetic read head of the IBM 3490 tape drive design.

Using the deposited poletip design for the write magnetic head of the present invention produced an output as is shown in FIG. 5B. The same read head was used as for FIG 5A. At a high write current of 100 milliamperes, the amplitude produced by the read head was close to 3000 microvolts, a decided improvement. The improvement is attributed to the higher saturation moment Bs of the soft magnetic film versus the magnetic ferrite block.

FIG. 6 shows that the characteristics of the magnetic head according to the present invention matches closely the advantages of the write saturation characteristics for the thin film head as shown in FIG 1A. Curves A show a curve 100 for the additional poletip stripe 30 of the present invention and a curve 102 for the deposited poletip of the head shown in FIG 1A. Curves A were taken for an applied wavelength of 744 flux changes per millimeter. Curves B show a curve 104 for the additional poletip stripe of the present invention and a curve 106 for the deposited poletip of FIG 1A. Curves B were obtained for an applied wavelength of 972 flux changes per millimeter of tape length. Curves C show a curve 108 for the additional poletip stripe 30 of the present invention and a curve 110 for the deposited poletip of FIG 1A; both curves were obtained when operating at a wavelength of 1488 flux changes per millimeter. Curves D include a curve 112 for the additional poletip 30 of the present invention and a curve 114 for the deposited poletips of FIG 1A. Again, both curves were taken at the same wavelength, this time at a wavelength of 1944 flux changes per millimeter.

It is clear from the curves A-D that the performance of the present invention matches the advantages of the performance of thin film pole pieces in write saturation characteristics, even at different wavelength operations. The magnetic head of the present invention offers the advantages of the performance of a thin film head while& retaining the wear characteristics of a magnetic ferrite head to keep magnetic gap erosion at a minimum.

The principals of the present invention have now been made clear in an illustrated embodiment. There will be, immediately obvious to those skilled in the art, many modifications of the structure, arrangement, proportions, the elements, materials, and components used in the practice of the invention. For instance, it is obvious that many different materials can be used for the thin film magnetic pole pieces and for the gap and other insulating materials used in the magnetic head of the preferred embodiment. The appended claims are, therefore, intended to cover and embrace any such modifications within the limits only of the 2 true spirit and scope of the invention.

What is claimed is:

1. A method of making a magnetic head comprising the steps of:
   obtaining a substrate of a magnetic ferrite;
   depositing a stripe of a magnetic material adjacent an edge of the obtained substrate to form at least a portion of a first pole piece;
   depositing a gap producing insulating material over the deposited stripe and the substrate to form a magnetic gap layer;
   depositing an electrically conductive material on the deposited insulating material to form conductor turns for the magnetic head, the first turn starting immediately adjacent the stripe as covered by the gap insulating material;
   depositing an insulating material over the deposited conductive material forming the conductor turns;
   depositing a magnetic material over the deposited gap producing insulating material and the conductor insulating material to form a second pole piece;

depositing a support insulating layer material over the deposited magnetic material adjacent a portion of the second pole piece;

depositing a leveling layer of insulating material over the deposited support insulating layer and the remaining portion of the deposited second pole piece material; and bonding a closure block of non-magnetic ceramic material to the deposited leveling layer.

2. A method as defined in claim 1 further including, after the step of obtaining a substrate, the step of depositing an undercoat layer of alumina.

3. A method as defined in claim 1 wherein the step of depositing a stripe of magnetic material, deposits a stripe having a width of approximately 12 micrometers and a thickness of approximately 5000 Angstroms.

4. A method as defined in claim 1 wherein the distance between the stripe of magnetic material and the first turn is approximately 2 micrometers.

5. A method as defined in claim 1 further comprising the step of depositing an undercoat layer between the substrate and the stripe of magnetic material.

* * * * *